(12) United States Patent
Zaffou et al.

(10) Patent No.: US 10,158,140 B2
(45) Date of Patent: Dec. 18, 2018

(54) FLOW BATTERY WITH ENHANCED DURABILITY

(75) Inventors: Rachid Zaffou, West Hartford, CT (US); Michael L. Perry, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 237 days.

(21) Appl. No.: 14/364,717

(22) PCT Filed: Dec. 20, 2011

(86) PCT No.: PCT/US2011/066131
§ 371 (c)(1),
(2), (4) Date: Jun. 12, 2014

(87) PCT Pub. No.: WO2013/095374
PCT Pub. Date: Jun. 27, 2013

(65) Prior Publication Data
US 2014/0315113 A1 Oct. 23, 2014

(51) Int. Cl.
*H01M 8/18* (2006.01)
*H01M 8/20* (2006.01)
*H01M 8/0273* (2016.01)

(52) U.S. Cl.
CPC ......... *H01M 8/188* (2013.01); *H01M 8/0273* (2013.01); *H01M 8/20* (2013.01); *Y02E 60/528* (2013.01)

(58) Field of Classification Search
CPC ....... H01M 8/188; H01M 8/0273; H01M 8/20
See application file for complete search history.

(56) References Cited

U.S. PATENT DOCUMENTS

| 3,152,013 A | 10/1964 | Juda | |
| 5,270,132 A * | 12/1993 | Breault | H01M 4/96 427/115 |

(Continued)

FOREIGN PATENT DOCUMENTS

| JP | S54-19228 | 7/1979 |
| JP | 02-148659 | 6/1990 |

(Continued)

OTHER PUBLICATIONS

Wang, W.H. and Wang, X.D. (2007). Investigation of Ir-modified carbon felt as the positive electrode of an all-vanadium redox flow batter. Electrochimica Acta 52 (2007) pp. 6755-6762.

(Continued)

*Primary Examiner* — Jimmy Vo
(74) *Attorney, Agent, or Firm* — Carlson, Gaskey & Olds, P.C.

(57) ABSTRACT

A flow battery includes at least one electrochemical cell that has a first electrode, a second electrode spaced apart from the first electrode and a separator arranged between the first electrode and the second electrode. A first storage portion and a second storage portion are respectively fluidly connected with the at least one electrochemical cell. A first liquid electrolyte and a second liquid electrolyte are located in the respective first storage portion and second storage portion. The first electrode has an area over which it is catalytically active with regard to the first liquid electrolyte and the second electrode has an area over which it is catalytically active with regard to the second liquid electrolyte such that the area of the first electrode is greater than the area of the second electrode.

14 Claims, 1 Drawing Sheet

(56) References Cited

U.S. PATENT DOCUMENTS

| | | | |
|---|---|---|---|
| 5,318,865 | A | 6/1994 | Kaneko et al. |
| 5,648,184 | A | 7/1997 | Inoue et al. |
| 5,851,694 | A | 12/1998 | Miyabayashi et al. |
| 7,855,015 | B1 | 12/2010 | Benson et al. |
| 9,166,243 | B2 | 10/2015 | Perry |
| 2003/0134163 | A1 | 7/2003 | Markoski et al. |
| 2004/0028989 | A1 | 2/2004 | Sun et al. |
| 2004/0197641 | A1 | 10/2004 | Visco |
| 2004/0241544 | A1 | 12/2004 | Nakaishi et al. |
| 2005/0074653 | A1* | 4/2005 | Broman ............. H01M 2/1653 429/493 |
| 2006/0147795 | A1 | 7/2006 | Li et al. |
| 2008/0274393 | A1 | 11/2008 | Markoski et al. |
| 2008/0292938 | A1 | 11/2008 | Perry et al. |
| 2009/0136789 | A1 | 5/2009 | Pien et al. |
| 2010/0003545 | A1* | 1/2010 | Horne ................ B60L 11/1824 429/471 |

FOREIGN PATENT DOCUMENTS

| | | |
|---|---|---|
| JP | H02-148659 | 6/1990 |
| JP | 2005228645 | 8/2005 |
| JP | 2006-156029 | 6/2006 |
| JP | 2010244972 | 10/2010 |
| JP | 2014-508384 | 4/2014 |
| WO | 03050900 | 6/2003 |
| WO | 2006026585 | 3/2006 |
| WO | 2011075135 | 6/2011 |

OTHER PUBLICATIONS

European Search Report for European Patent Application No. 11877697.0 completed Jul. 15, 2015.
International Search Report and Written Opinion for International Application No. PCT/US2011/066131 completed on Apr. 17, 2012.
File History for U.S. Appl. No. 13/513,651 now U.S. Pat. No. 9,166,243 issued Oct. 20, 2015.
Certified Translation. Japanese Publication of Examined Patent Application No. S52-102887 published Jul. 13, 1979.
Certified Translation. Japanese Unexamined Patent Application No. H2-148659 published Jun. 7, 1990.
Certified Translation. Japanese Unexamined Patent Application No. 2006-156029 published Jun. 15, 1990.
Linden, D. and Reddy, T.B. Eds. (2002). Handbook of batteries. New York, NY: McGraw-Hill. pp. 37.12, 18-23, 42.3-13, 43.11-3, Appendix A.
Laramini, J. and Dicks, A. (2003). Fuel cell systems explained. Chichester, England: John Wiley & Sons Inc. pp. xv, xvi, 18-19, 88-89, 94-96.
Haar, D. (2016). Dan Haar: United Technologies battery could upend the power business. Hartford Courant. Retrieved Feb. 22, 2017 from: http://www.courant.com/business/dan-haar/hc-haar-united-technologies-battery-for-electric-grid-20160523-column.html.

Aricò, A.S., Cretì, P., Baglio, V., Modica, E., and Antonucci, V. (2000). Influence of flow field design on the performance of a direct methanol fuel cell. Journal of Power Sources vol. 91. 2000. pp. 202-209.
Li, X. and Sabir, I. (2004). Review of bipolar plates in PEM fuel cells: Flow-field designs. International Journal of Hydrogen Energy vol. 30. 2005. pp. 359-371.
Negishi, A. (2003). Redox flow battery. (Certified Translation). Fuel Cells vol. 2(4). 2003. pp. 69-74.
Yi, J.S., and Nguyen T.V. (1996). Abstract: Hydrodynamics of reactant gas in the electrode of PEM fuel cells with inter-digitated flow fields. The Electrochemical Society, Inc. Meeting Abstracts. Fall Meeting, San Antonio, TX. Oct. 6-11, 1996. p. 974-6.
Kazim, A., Liu, H.T., and Forges, P. (1999). Modelling of performance of PEM fuel cells with conventional and interdigitated flow fields. Journal of Applied Electrochemistry vol. 29(12). 1999. pp. 1409-1416.
Wang, L. and Liu, H. (2004). Performance studies of PEM fuel cells with interdigitated flow fields. Journal of Power Sources vol. 13(2). 2004. pp. 185-196.
Guo, S.M. (2005). The simulation of a PEMFC with an interdigitated flow field design. Computational Science 5th International Conference. May 2005. pp. 104-111.
He, W., Yi, J.S., Nguyen, T.V. (2000). Two-phase flow model of the cathode of PEM fuel ceels using interdigitated flow fields. AIChE Journal vol. 46(10). Oct. 2000. pp. 2053-2064.
Nozaki, K., Hamamoto, O., Kaneko, H., and Ozawa, T. (1975). (Certified Translation). Prospect of power storage using redox flow type secondary battery. Electrochemical/Electro-thermal Study Group Material. The Institute of Electrical Engineers of Japan. Nov. 28, 1975. pp. 1-16.
Declaration of Dr. Toru Kato, Ph.D. In re U.S. Pat. No. 9,166,243. Executed Feb. 23, 2017. pp. 1-89.
Prior Art Claim Chart for U.S. Pat. No. 9,166,243.
Ponce de León, C., Frías-Ferrer, A., González-García, Szánto, D.A., and Walsh, F.C. (2006). Redox flow cells for energy conversion. Journal of Power Sources vol. 160. 2006. pp. 716-732.
Negishi, A. (2003). Redox flow battery. Fuel Cells vol. 2(4). 2003. pp. 69-74.
Nozaki, K., Hamamoto, O., Kaneko, H., and Ozawa, T. (1975). Prospect of power storage using redox flow type secondary battery. Electrochemical/Electro-thermal Study Group Material. The Institute of Electrical Engineers of Japan. Nov. 28, 1975. pp. 1-16.
Shigematsu, T. (2011). Redox flow battery for energy storage. SEI Technical Review No. 73. Oct. 2011. pp. 4-13.
Tokuda, N., Kanno, T., Hara, T., Shigematsu, T., Tsutsui, Y., Ikeuchi, A., Itou, T., et al. (2000). Development of a redox flow battery system. SEI Technical Review No. 73. Jun. 2000. pp. 88-94.
Hagedorn, N.H. (1984). NASA redox storage system development project. Final Report. DOE/NASA/12726-24. Oct. 1984. pp. 1-43.
Sumitomo Electric. Redox Flow Battery. Technical Document. Retrieved May 8, 2017 from: http://global-sei.com/products/redox/pdf/redox-flow-battery.pdf.
Petition for Inter Partes Review of U.S. Pat. No. 9,166,243. *Sumitomo Electric Industries, Ltd.*, Petitioner, v. *United Technologies Corporation*, Patent Owner. Filed Feb. 23, 2017.

* cited by examiner

FLOW BATTERY WITH ENHANCED DURABILITY

BACKGROUND

This disclosure relates to flow batteries for selectively storing and discharging electric energy.

Flow batteries, also known as redox flow batteries or redox flow cells, are designed to convert electrical energy into chemical energy that can be stored and later released when there is demand. As an example, a flow battery may be used with a renewable energy system, such as a wind-powered system, to store energy that exceeds consumer demand and later release that energy when there is greater demand.

A basic flow battery includes a redox flow cell that has a negative electrode and a positive electrode separated by an electrolyte layer, which may include separator such as an ion-exchange membrane. A negative liquid electrolyte is delivered to the negative electrode and a positive liquid electrolyte is delivered to the positive electrode to drive an electrochemically reversible redox reaction. Upon charging, the electrical energy supplied causes a chemical reduction reaction in one electrolyte and an oxidation reaction in the other electrolyte. The separator prevents the electrolytes from mixing but permits selected ions to pass through to complete the redox reactions. Upon discharge, the chemical energy contained in the liquid electrolytes is released in the reverse reactions and electrical energy can be drawn from the electrodes. Flow batteries are distinguished from other electrochemical devices by, inter alia, the use of externally-supplied, liquid electrolytes that participate in a reversible electrochemical reaction.

SUMMARY

Disclosed is a flow battery that includes at least one electrochemical cell that has a first electrode, a second electrode spaced apart from the first electrode and separator arranged between the first electrode and the second electrode. A first storage portion and a second storage portion are respectively fluidly connected with the at least one cell. A first liquid electrolyte and a second liquid electrolyte are located in the respective first storage portion and the second storage portion. The first electrode has an area over which it is catalytically active with regard to the first liquid electrolyte and the second electrode has an area over which it is catalytically active with regard to the second liquid electrolyte such that the area of the first electrode is greater than the area of the second electrode.

Also disclosed is a method for controlling degradation in a flow battery. The method includes controlling a potential for corrosion by establishing a first electrode to have an area over which it is catalytically active with regard to a first liquid electrolyte and a second electrode to have an area over which it is catalytically active with regard to a second liquid electrolyte such that the area of the first electrode is greater than the area of the second electrode.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
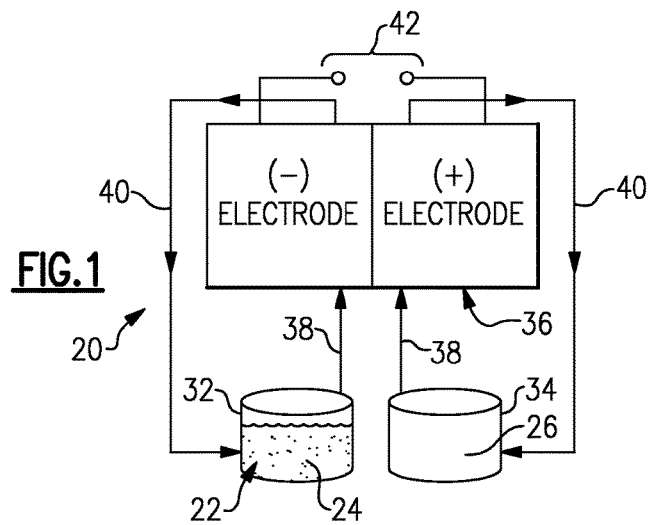
FIG. 1 shows an example flow battery.

FIG. 1 schematically illustrates selected portions of an example flow battery 20 for selectively storing and discharging electrical energy. As an example, the flow battery 20 can be used to convert electrical energy generated in a renewable energy system to chemical energy that is stored until a later time when there is greater demand at which the flow battery 20 then converts the chemical energy back into electrical energy. The flow battery 20 can supply the electric energy to an electric grid, for example. As will be described, the disclosed flow battery 20 includes features for enhanced durability.

The flow battery 20 includes at least one liquid electrolyte 22 that has an electrochemically active specie 24 that functions in a redox pair with regard to a second reactant 26, which can be another liquid electrolyte with electrochemically active specie, or any other electrochemically active specie such as hydrogen or air, for example. For example, the electrochemically active species are based on vanadium, bromine, iron, chromium, zinc, cerium, lead or combinations thereof. In embodiments, the liquid electrolytes 22 and 26 are aqueous solutions that include one or more of the electrochemically active species 24 and 30.

The liquid electrolyte 22 and reactant 26 are contained in respective storage portions 32 and 34, such as tanks. As shown, the storage portions 32 and 34 are substantially equivalent cylindrical storage tanks; however, the storage portions 32 and 34 can alternatively have other shapes and sizes.

The liquid electrolytes 22 and 26 are delivered (e.g., pumped) to one or more electrochemical cells 36 of the flow battery 20 through respective feed lines 38 and are returned from the electrochemical cell 36 to the storage portions 32 and 34 via return lines 40. Thus, the storage portions 32 and 34 are external of the electrochemical cell 36 and are fluidly connected with the electrochemical cell 36 to circulate the liquid electrolytes 22 and 26 there through.

In operation, the liquid electrolytes 22 and 26 are delivered to the electrochemical cell 36 to either convert electrical energy into chemical energy or convert chemical energy into electrical energy that can be discharged. The electrical energy is transmitted to and from the electrochemical cell 36 through an electrical pathway 42 that completes the circuit and allows the completion of the electrochemical redox reactions.

Figure 2:
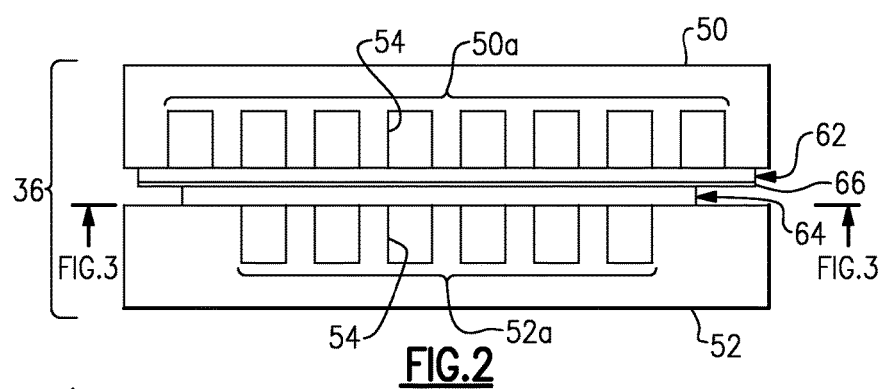
FIG. 2 shows an example electrochemical cell.

FIG. 2 shows a cross-section of a portion of one of the electrochemical cells 36. It is to be understood that the flow battery 20 can include a plurality of such electrochemical cells 36 in a stack, depending on the designed capacity of the flow battery 20.

In this example, the electrochemical cell 36 includes a first bipolar plate 50 and a second bipolar plate 52 spaced apart from the first bipolar plate 50. The bipolar plates 50 and 52 are electrically conductive and can be graphite plates or metallic plates, for example. The bipolar plates 50 and 52 may include a plurality of channels 54 that serve as flow fields for delivering the liquid electrolytes 22 and 26 within the electrochemical cell 36.

A first electrode 62 is arranged adjacent the first bipolar plate 50 and a second electrode 64 is arranged adjacent the second bipolar plate 52. In the illustrated example, the first electrode 62 is in contact with the face of the first bipolar plate 50 and the second electrode 64 is in contact with the face of the second bipolar plate 52. A separator, such as an ion-exchange membrane, 66 is arranged between, and in contact with, the electrodes 62 and 64. In this example, the first electrode 62 is an anode electrode and the second electrode 64 is a cathode electrode.

The first electrode 62 and the second electrode 64 are porous materials that are electrically conductive and catalytically active for the desired redox reactions, such as porous carbon electrodes. As an example, one or both of the electrodes 62 and 64 include a carbon paper or felt materials that are catalytically active with regard to the liquid electrolytes 22 and 26. That is, the surfaces of the carbon material are catalytically active in the flow battery 20. In the redox reactions of the flow battery 20, the energy barrier to the reaction is relatively low, and thus stronger catalytic materials, such as noble metals or alloys, are typically not required as with electrochemical devices that utilize gaseous reactants such as oxygen or hydrogen. The carbon material can be activated using a thermal and/or chemical treatment processes to clean the carbon material and produce oxides that serve as active catalytic sites.

In operation, the liquid electrolytes 22 and 26 are pumped from the storage portions 32 and 34 into the respective bipolar plates 50 and 52. In this regard, the bipolar plates can include manifolds and the like for delivering the liquid electrolytes 22 and 26 into the channels 54. The liquid electrolytes 22 and 26 flow through the channels 54 and are delivered to the electrodes 62 and 64. It is to be understood that the bipolar plates 50 and 52 and the channels 54 are optional in the flow battery 20. That is, the flow battery 20 can alternatively be configured for "flow-through" operation where the liquid electrolytes 22 and 30 are pumped directly into the electrodes 62 and 64 without the use of flow field channels.

In operation, there can be a high electrical over-potential at the second electrode 64 (the cathode), which results in corrosion degradation of materials within the flow battery 20. Thus, the term "high electrical over-potential" refers to a potential that is sufficient to drive corrosive degradation of one or more materials within the electrochemical cell 36. Under designed operation conditions in the electrochemical cell 36, the potential is maintained below a potential that drives corrosion degradation of the selected materials. However, localized starvation of anolyte is one condition that can cause the electrical potential to change in localized areas of an anode electrode in a flow battery. Carbon material, such as carbon in the second electrode 64 and/or the bipolar plate 52, any metal or metal alloys or other materials subject to corrosion degradation in the electrochemical cell 36 can degrade in this over-potential condition and ultimately debit the durability of the flow battery 20. The electrochemical mechanisms and operational circumstances responsible for the degradation are understood by those skilled in the art and are therefore not further discussed herein.

Figure 3:
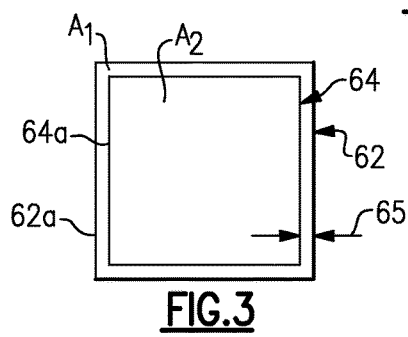
FIG. 3 shows a first electrode and a second electrode of different sizes.

The electrochemical cell 36 includes features for controlling (e.g., limiting) the potential for corrosion degradation. FIG. 3 shows a view of the first electrode 62 and the second electrode 64 according to the section shown in FIG. 2. The first electrode 62 has an area $A_1$ over which it is catalytically active with regard to the first liquid electrolyte 22 and the second electrode 64 has an area $A_2$ over which it is catalytically active with regard to the second liquid electrolyte 26. The area $A_1$ is greater than the area $A_2$. The separator 66 also has an area, $A_3$, which in this example is equal to the area $A_1$.

Selecting the area $A_1$ to be greater than the area $A_2$ ensures that wherever there is catholyte (liquid electrolyte 26) present within the second electrode 64 there will also be anolyte (first electrolyte 22) present in the first electrode 62 such that localized starvation of the anolyte is limited or prevented. Thus, establishing the area $A_1$ to be greater than the area $A_2$ controls the potential for corrosion degradation and thereby enhances the durability of the flow battery 20.

The areas $A_1$ and $A_2$ over which the respective electrodes 62 and 64 are catalytically active, or "effective areas," are areas that have open porosity for receiving the respective liquid electrolytes 22 and 26. As will be described, the areas $A_1$ and $A_2$ can be defined by the physical sizes of the electrodes 62 and 64, by the sizes of the perimeters of the effective areas, or both.

In a further embodiment, in accordance with the differential areas $A_1$ and $A_2$, the first bipolar plate 50 optionally includes a larger flow field than the second bipolar plate 52. The areas of the flow fields are defined by a perimeter that circumscribes all of the channels 54 in the respective bipolar plates 50 and 52. In FIG. 2, the area of the flow field of the first bipolar plate 50 is denoted at 50a and the area of the flow field of the second bipolar plate 52 is denoted at 52a.

In the example shown in FIG. 3, the electrodes 62 and 64 extend between respective edges 62a and 64a. As shown, the edges 62a and 64a extend on four sides and thus the electrodes 62 and 64 are each provided in a square shape, although other shapes can alternatively be selected. The edges 64a of the second electrode 64 are indented inwardly with regard to the edges 62a of the first electrode 62. Thus, the areas $A_1$ and $A_2$ in this embodiment are defined by the edges 62a and 64a and thus the physical sizes of the electrodes 62 and 64. In a further embodiment, the edges 64a are indented a uniform distance inwardly of the edges 62a such that there is a substantially uniform band 65 around the periphery of the second electrode 64.

Figure 4:
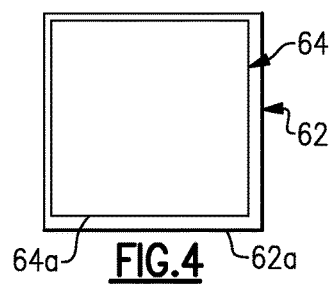
FIG. 4 shows another arrangement of the electrodes shown in FIG. 3.

In another example shown in FIG. 4, the indentation distance is non-uniform around the second electrode 64 such that the indentation distance on at least one side is greater than an indentation distance on another side. For example, the indentation distance between the edges 62a and 64a is non-uniform around the electrodes 62 and 64. In comparison, in the example shown in FIG. 3, the edges 64a are indented a uniform distance inwardly of the edges 62a. In a further example, the designed indentation distance should be slightly larger than the maximum indentation that can result from the anticipated manufacturing tolerances.

Figure 5:
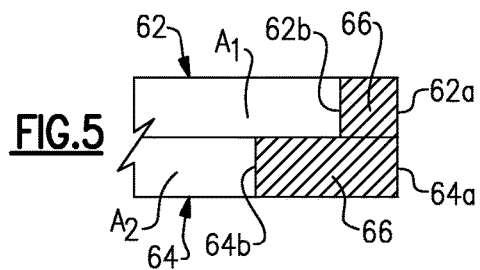
FIG. 5 shows frame seals around the periphery of a first electrode and a second electrode.

In another example shown in FIG. 5, frame seals 66 establish the areas $A_1$ and $A_2$. The frame seals 66 extend around the outside periphery of each of the electrodes 62 and 64. As an example, each frame seal 66 includes a seal material, such as a polymeric material, that is impregnated into the edges 62a and 64a of the electrodes 62 and 64 to prevent escape of the liquid electrolytes 22 and 26. The seal material infiltrates into the pores of the electrodes 62 and 64 and, upon solidification, prevents or substantially prevents liquid electrolyte from flowing in that portion of the electrode 62 or 64. Thus, the areas of the frame seals 66 of the electrodes 62 and 64 are not catalytically active and therefore are not part of the effective area of the electrodes 62 and 64 for participating in the electrochemical reactions.

The frame seals 66 serve as a perimeter boundary of the areas $A_1$ and $A_2$. The impregnation of the seal material can be controlled such that the seal material penetrates a greater in-plane distance into the second electrode 64 than into the first electrode 62. That is, in the in-plane direction, the thickness of the frame seal 66 of the first electrode 62 is less than the thickness of the frame seal 66 of the second electrode 64. In the drawing, 62b denotes the perimeter of the area $A_1$ and 64b denotes the perimeter of the area $A_2$.

Figure 6:
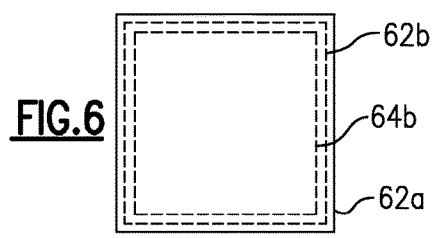
FIG. 6 shows an indentation of a perimeter of an area of a second electrode from the perimeter of an area of a first electrode.

FIG. 6 shows another view of the perimeters 62b and 64b. As shown, similar to the indentation of the edges 64a and 62a, the perimeter 64b of the second electrode 64 is indented inwardly of the perimeter 62b of area $A_1$ of the first electrodes 62. Thus, although the edges 62a and 64a may or may not be flush, the perimeters 62b and 64b are non-flush to achieve the difference in area between $A_1$ and $A_2$.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A flow battery comprising:
    at least one electrochemical cell including a first electrode, a second electrode spaced apart from the first electrode, and a separator layer arranged between, and in direct contact with, the first electrode and the second electrode;
    a first storage portion and a second storage portion respectively fluidly connected with the at least one electrochemical cell; and
    at least one electrolyte in one of the first storage portion or the second storage portion,
    wherein the first electrode has an area $A_1$ over which it is catalytically active with regard to a first liquid electrolyte and the second electrode has an area $A_2$ over which it is catalytically active with regard to a second liquid electrolyte, and the area $A_1$ is greater than the area $A_2$, and
    wherein the first electrode and the second electrode each include a frame seal that comprises a seal material that is impregnated into pores the respective first electrode and second electrode to provide the respective area $A_1$ and area $A_2$, and the frame seals have an in-plane thickness at the edges of the respective first electrode and second electrode such that the in-plane thickness of the frame seal of the first electrode is less than the in-plane thickness of the frame seal of the second electrode.

2. The flow battery as recited in claim 1, wherein the first electrode is an anode electrode and the second electrode is a cathode electrode.

3. The flow battery as recited in claim 1, wherein the first electrode is non-flush with the second electrode with regard to edge alignment of the electrodes.

4. The flow battery as recited in claim 1, wherein the perimeter of the area $A_2$ is indented inwardly of the perimeter of the area $A_1$.

5. The flow battery as recited in claim 4, wherein the perimeter of the area $A_2$ is indented a uniform distance around the perimeter of the area $A_1$.

6. The flow battery as recited in claim 4, wherein the perimeter of the area $A_2$ is indented a non-uniform distance around the perimeter of the area $A_1$.

7. The flow battery as recited in claim 1, wherein edges of the second electrode are indented inwardly of edges of the first electrode.

8. The flow battery as recited in claim 1, wherein the at least one electrochemical cell includes a first bipolar plate arranged adjacent the first electrode and a second bipolar plate arranged adjacent the second electrode, the first bipolar plate including a first flow field and the second bipolar plate including a second flow field that extends over an area that is less than an area over which the first flow field extends.

9. The flow battery as recited in claim 1, wherein the separator is an ion-exchange material.

10. The flow battery as recited in claim 1, wherein the separator has an area $A_3$ that is equal to the area $A_1$.

11. The flow battery as recited in claim 1, wherein the first electrode and the second electrode are carbon paper or carbon felt.

12. The flow battery as recited in claim 1, wherein the separator is an ion-exchange material, and the separator has an area $A_3$ that is equal to the area $A_1$.

13. The flow battery as recited in claim 1, wherein the frame seal is a polymeric material.

14. A method for controlling degradation in a flow battery, the method comprising:
    controlling a potential for corrosion of flow battery electrochemical cell components by establishing a first electrode to have an area A1 over which it is catalytically active with regard to a first liquid electrolyte and a second electrode to have an area A2 over which it is catalytically active with regard to a second liquid electrolyte such that the area A1 is greater than the area A2,
    wherein the flow battery comprises:
    the second electrode spaced apart from the electrode, and a separator layer arranged between, and in direct contact with the first electrode and the second electrode,
    a first storage portion and a second storage portion respectively fluidly connected with an electrochemical cell,
    the first electrolyte in one of the first storage portion or the second storage portion,
    wherein the first electrode and the second electrode each include a frame seal that comprises a seal material that is impregnated into pores the respective first electrode and second electrode to provide the respective area A1 and area A2, and the frame seals have an in-plane thickness at the edges of the respective first electrode and second electrode such that the in-plane thickness of the frame seal of the first electrode is less than the in-plane thickness of the frame seal of the second electrode.

* * * * *